F. SAXON.
TRACTOR HITCH.
APPLICATION FILED MAR. 3, 1919.
1,319,421.
Patented Oct. 21, 1919.
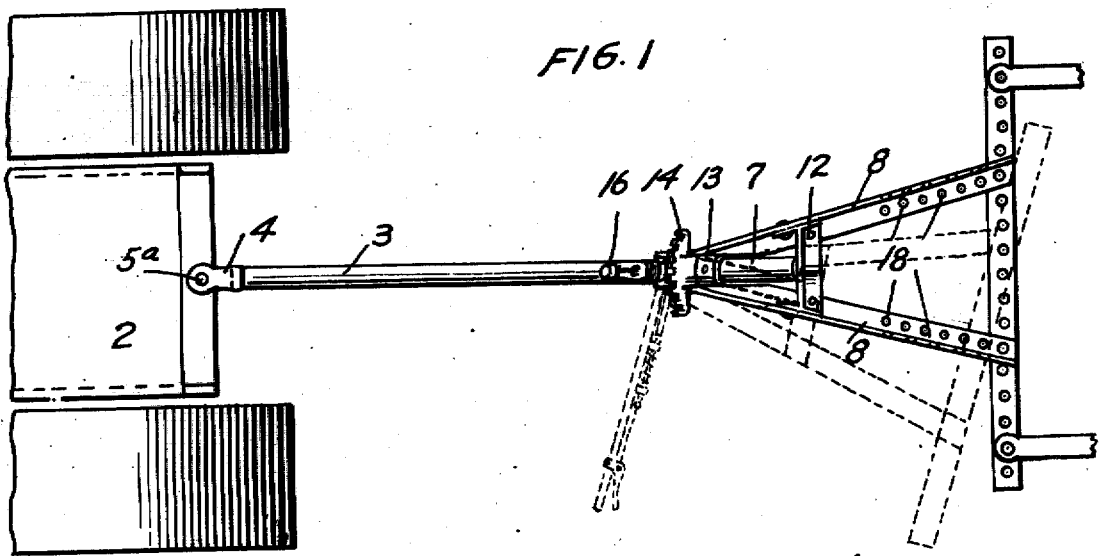
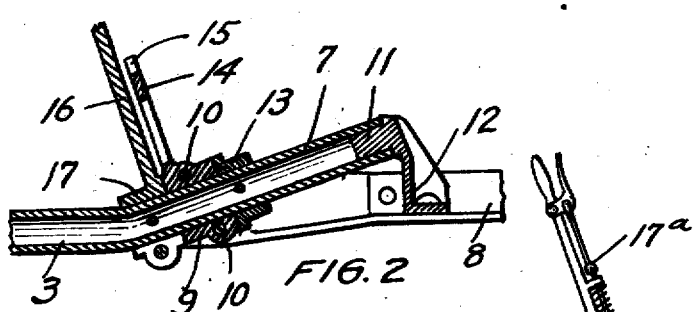
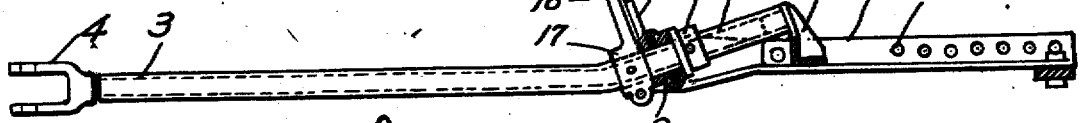
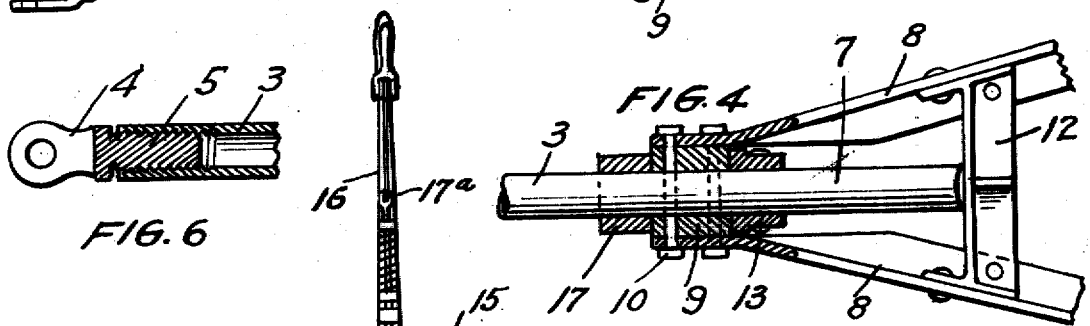
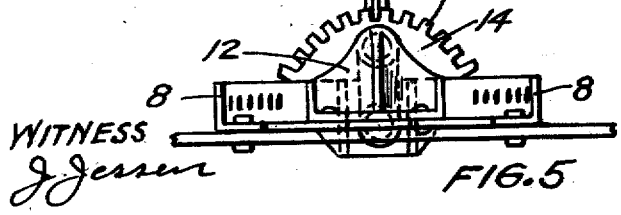
INVENTOR
FRANK SAXON.
BY
HIS ATTORNEYS
WITNESS

UNITED STATES PATENT OFFICE.

FRANK SAXON, OF WORTHINGTON, MINNESOTA.

TRACTOR-HITCH.

1,319,421.

Specification of Letters Patent. Patented Oct. 21, 1919.

Application filed March 3, 1919. Serial No. 280,443.

*To all whom it may concern:*

Be it known that I, FRANK SAXON, a citizen of the United States, resident of Worthington, county of Nobles, State of Minnesota, have invented certain new and useful Improvements in Tractor-Hitches, of which the following is a specification.

The object of this invention is to provide a draft connection or hitch which will enable the driver of a tractor to easily and quickly counteract the tendency of a plow to drift down hill during the operation of plowing on rolling or side hill ground, and thereby the operator is able to maintain the desired width of cut of the furrow.

A further object is to provide a hitch which can be utilized for a variety of other purposes, such as hauling wagons tandem, or binders, the driver of the tractor having full control at all times of the direction of travel of the implements or machines he may be pulling and can make square corners or curves easily and quickly.

A further object is to provide a hitch of simple construction and one which will be strong and durable and easily attached to a tractor and the load or implement to be pulled.

The invention consists generally in various constructions and combinations, all as hereinafter described and particularly pointed out in the claims.

In the accompanying drawings forming part of this specification,

Figure 1 is a plan view of a tractor hitch embodying my invention,

Fig. 2 is a sectional view, showing the manner of mounting the shifting device on the members of the hitch.

Fig. 3 is a side view, partly in section, of the hitch ready for attachment,

Fig. 4 is a plan sectional view of the rear portion of the hitch,

Fig. 5 is a rear end view,

Fig. 6 is a detail sectional view, showing the swivel coupling for connecting the forward member of the hitch with the tractor.

In the drawing, 2 represents a tractor of any suitable type. 3 is the forward member of the hitch, shown here as composed of pipe of suitable size, and 4 is a coupling having a shank 5 that is tapped into the end of the member 3 and is free to turn therein, the forward end of the coupling being forked and attached to the tractor by suitable means, such as the pin 5ᵃ. This connection forms a swivel between the tractor and the forward member of the hitch.

The rear portion of the member 3, indicated by reference numeral 7, is bent in angular or oblique relation to the forward portion, as indicated plainly in Fig. 3. 8 represents converging draft bars and 9 is a block interposed between the forward ends of said bars and secured thereto by means of bolts 10 passing through said bars and block. The angular portion 7 of the member 3 is journaled in the block 9 and its rear end has a bearing on a stud 11 that is carried by a cross bar 12 interposed between the bars 8 and rigidly secured thereto. A collar 13 on the angular portion 7 holds it against longitudinal movement and separation from the stud 11. The block 9 has a web 14 thereon forming a quadrant provided with teeth 15 and a lever 16 has its hub 17 secured to the forward portion of the part 7, preferably at a point where it merges into the straight section 3. The lever 16 has the usual locking latch device 17ᵃ for engagement with the teeth 15 to lock the lever thereon. This lever, as indicated in Fig. 1, oscillates transversely to the direction of pull of draft line of the tractor and evidently if the forward end of the member 3 is held against lateral movement and is rotated on a longitudinal axis by the movement of said lever, the angular section 7 will be swung to one side or the other, depending upon the direction of movement of the lever and the draft bars 8 will be correspondingly moved, shifting the implement, binder or other load that is being drawn and changing its direction of pull to compensate for any drifting movement of the implement down hill or for any other purpose.

The draw bars 8 are preferably provided with a series of holes 18 therein for convenience of adjustment to the implement or load to which the tractor may be attached. These bars may be made of any suitable material, preferably angle bar, and the section 3 may be made of other material than the pipe shown, if preferred, and the oblique bend or angle of the part 7 with respect to the forward portion of this member may be increased or decreased, as may seem desirable and best suited for the purpose. This oblique bend may be of any suitable length, its degree may be varied and the direction of the bend may be changed without affecting the general result obtained. If preferred, the coupling 4 may be removed and a section of pipe inserted in place of the threaded stud for the purpose of increasing the length of the hitch to adapt it for a variety of draft purposes. These features, however, are merely incidental to the broad idea of the device, which comprises the angle member with means for rocking it to change the direction of pull of the draw bars.

I claim as my invention:

1. A tractor hitch comprising a draft member having means for attachment with the tractor, a draw bar journaled on said member at an oblique angle to the longitudinal axis thereof, and means for rocking said member on said longitudinal axis to shift said draw bar laterally to change the line of draft.

2. A tractor hitch comprising a member having means for connection with a source of power and provided with a rear portion at an angle to the draft line, a draw bar journaled at an angle with respect to said rear portion, and means for rocking said member on its longitudinal axis to shift said draw bar laterally to change the line of draft.

3. A tractor hitch comprising a forward member having means for attachment with a source of power and a rear portion at an angle to the forward portion thereof, draft bars journaled on said angled rear portion and having a bearing for the rear end thereof, and means for rocking said forward member on its longitudinal axis to shift the angled rear portion from side to side and move said draft bars laterally.

4. A tractor hitch comprising a forward member having means for connection with a source of power and provided with a rear portion at an angle to the forward part thereof, a draft bar having a bearing on said rear portion and provided with a transversely arranged rack, an operating lever having its hub secured on said rear portion for rocking said member on its longitudinal axis and provided with a locking latch for engaging said rack to shift said draw bars laterally and change the direction of pull.

5. A tractor hitch comprising a section of pipe having a swivel connection at its forward end for adjustment to a tractor, the rear end of said pipe being bent at an angle to the forward portion, draft bars journaled on said bent rear end and an operating lever mounted on said pipe for rocking it on its longitudinal axis and shifting said bent end from side to side and moving said draft bars laterally to change the line of draft.

In witness whereof, I have hereunto set my hand this 20th day of February, 1919.

FRANK SAXON.